(12) United States Patent
Gao et al.

(10) Patent No.: US 10,829,615 B2
(45) Date of Patent: Nov. 10, 2020

(54) LONG-ACTING RUBBER ANTI-DEGRADANT AND RUBBER COMPOSITION COMPRISING THE SAME FOR TIRES

(71) Applicant: Sennics Co., Ltd., Shanghai (CN)

(72) Inventors: Yang Gao, Shanghai (CN); Biao Zou, Shanghai (CN)

(73) Assignee: Sennics Co., Ltd., Shanghai (CN)

( * ) Notice: Subject to any disclaimer, the term of this patent is extended or adjusted under 35 U.S.C. 154(b) by 63 days.

(21) Appl. No.: 16/217,006

(22) Filed: Dec. 11, 2018

(65) Prior Publication Data

US 2019/0375913 A1  Dec. 12, 2019

(30) Foreign Application Priority Data

Jun. 12, 2018 (CN) .......................... 2018 1 0619457

(51) Int. Cl.
C08K 5/18 (2006.01)
C08L 9/00 (2006.01)
B60C 1/00 (2006.01)

(52) U.S. Cl.
CPC .............. C08K 5/18 (2013.01); B60C 1/0025 (2013.01); C08L 9/00 (2013.01); B60C 2001/0066 (2013.01); C08L 2201/08 (2013.01)

(58) Field of Classification Search
CPC ... C08L 9/00; C08L 7/00; C08L 21/00; B60C 1/0016; B60C 1/0025; B60C 1/00; C08K 5/18
USPC ........................................................ 523/155
See application file for complete search history.

(56) References Cited

U.S. PATENT DOCUMENTS

| | | | |
|---|---|---|---|
| 4,431,841 A | 2/1984 | Malz, Jr. et al. | |
| 4,804,783 A | 2/1989 | Nagata et al. | |
| 5,319,010 A * | 6/1994 | Mitani ..................... | C08K 5/18 524/252 |
| 5,726,248 A * | 3/1998 | Wideman ............... | C08G 73/02 525/157 |
| 8,575,392 B2 | 11/2013 | Yoshimoto et al. | |
| 2018/0237376 A1* | 8/2018 | Guo ....................... | C07C 209/60 |

FOREIGN PATENT DOCUMENTS

| | | | |
|---|---|---|---|
| CN | 102584596 S | | 7/2012 |
| CN | 106608827 A | * | 5/2017 |
| EP | 0 941 872 A2 | * | 9/1999 |

OTHER PUBLICATIONS

Wang, Wei et al., "New Synthesis of Phenyl/Phenyl End-Capped Tetraaniline in the Leucoemeraldine and Emeraldine Oxidation States," Synthetic Metals, vol. 129, No. 2, pp. 199-205 (Jul. 10, 2002).

* cited by examiner

Primary Examiner — Doris L Lee
(74) Attorney, Agent, or Firm — Mei & Mark LLP; Manni Li

(57) ABSTRACT

Novel and long-acting rubber anti-degradant and rubber composition comprising the same for tires. The anti-degradant comprises at least two compounds, each of which is selected from a compound of Formula I, II, III-a, or III-b:

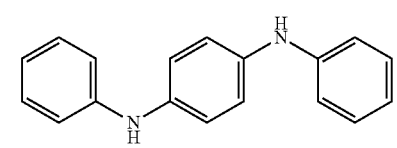

I

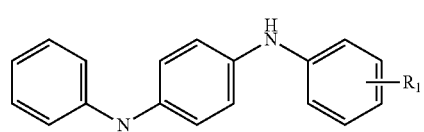

II

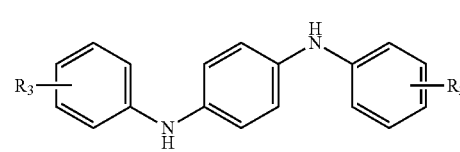

III-a

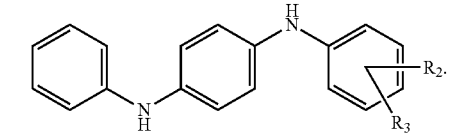

III-b and each of the compounds have different formulae from others, and can't be compounds of formula III-a and III-b at the same time when the anti-degradant consists of only 2 compounds. The anti-degradant is used to provide a rubber composition with improved long-term resistance to thermo-oxidative aging and ozone aging.

26 Claims, No Drawings

LONG-ACTING RUBBER ANTI-DEGRADANT AND RUBBER COMPOSITION COMPRISING THE SAME FOR TIRES

CROSS-REFERENCE TO RELATED APPLICATION

The subject application claims priority on Chinese application no. CN201810619457.9 filed on Jun. 12, 2018. The contents and subject matter of the Chinese priority application are incorporated herein by reference.

TECHNICAL FIELD

The present invention relates to rubber anti-degradant and rubber composition for tires, particularly, a composite rubber anti-degradant that is novel and has long-acting effect and the rubber composition comprising the same for tires.

BACKGROUND ART

A tire is an important component of a modern automobile, which is generally used under complex and harsh conditions where it endures various forms of deformation, loads, forces, and high or low temperature actions during running. Its performances have a direct influence on the economy and safety of a running automobile.

The belt ply and sidewall of a tire are two important parts of the tire, and both require extraordinarily high durability. The belt ply is composed of rubber and reinforcing material. As the part of the belt ply is being compressed at certain frequency when the tire is rolling, the rubber composition of the belt ply is required to have extremely high resistance to crack propagation and thermo-oxidative aging. To resist cracking and thermo-oxidative aging, an effective and long-acting anti-degradant must be used to ensure its long-term durability. The sidewall of the tire is another key part that determines tire performances, particularly for a radial tire. The sidewall of the tire is subject to long-term damages from sunlight, rain, high temperature, ozone, etc., and the tire is deflected periodically in the course of running. In order to guarantee long-term utility of the tire, the rubber composition of the sidewall is required to have excellent resistance to deflection, thermo-oxidative aging, and ozone aging. Hence, a high-performance and long-acting anti-degradant should be selected for use in the rubber composition.

Anti-degradants in the category of p-phenylenediamine, e.g., N,N'-bis-(1,4-dimethylamyl)-p-phenylenediamine (77PD), N-isopropyl-N'-phenyl-p-phenylenediamine (IPPD), N-1,3-dimethylbutyl-N'-phenyl-p-phenylenediamine (6PPD), and a mixture of diphenyl xylyl p-phenylenediamine and phenyl tolyl p-phenylenediamine (3100), have long been selected for use in rubber compositions for tires, particularly in rubber compositions for belt plies and sidewalls. These p-phenylenediamine anti-degradants protect rubber compositions from both thermo-oxidative aging and ozone aging, but they do not exhibit good persistency.

SUMMARY OF THE INVENTION

The present invention discloses a rubber anti-degradant and rubber composition comprising the same. The rubber composition of the present invention exhibits improved long-term resistance to thermo-oxidative aging and ozone aging and is particularly useful for an entire or partial rubber matrix of a tire.

The anti-degradant of the present invention comprises at least two compounds, and each of the compounds is selected from a compound of Formula I, a compound of Formula II, a compound of Formula III-a, or a compound of formula III-b, the selected compounds have different formulae, and the selected compounds are not compounds of formulae III-a and III-b at the same time if there are only two compounds in the anti-degradant:

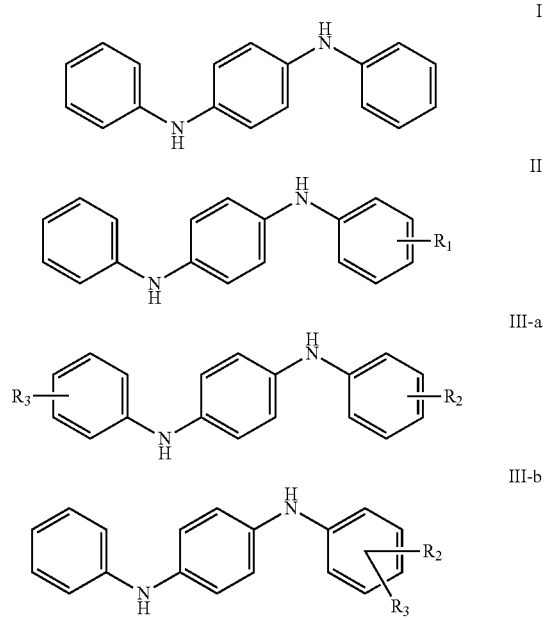

wherein $R_1$ is a C1-C12 alkyl or C3-C8 cycloalkyl; and $R_2$ and $R_3$ are identical or different, each being independently selected from a C1-C12 alkyl and a C3-C8 cycloalkyl.

In the present invention, $R_1$ may be in an ortho- or para-position. Further, in the present invention, $R_1$ may be a C3-C8 cycloalkyl or a C1-C12 alkyl in the para-position, or a C1-C12 alkyl in the ortho-position. Preferably, $R_1$ is methyl or butyl in the ortho-position, or methyl, cyclohexyl, or 2,4,6-trimethyloctyl in the para-position.

In the present invention, $R_2$ may be in an ortho-position, and $R_3$ may be in a meta- or para-position; and both $R_2$ and $R_3$ may be a C1-C6 alkyl, whether identical or different.

In the compound of Formula III-a of present invention, $R_2$ may be a C1-C4 alkyl in the ortho-position, and $R_3$ may be a C1-C4 alkyl in the meta-position. Preferably, $R_2$ is methyl in the ortho-position, and $R_3$ is methyl or ethyl in the meta-position in Formula III-a.

In the compound of Formula III-b of the present invention, $R_2$ may be a C1-C4 alkyl in the ortho-position, and $R_3$ may be a C1-C6 alkyl in the para-position. Preferably, $R_2$ is methyl or ethyl in the ortho-position, and $R_3$ is ethyl, isobutyl, or 1,3-dimethylbutyl in the para-position.

In one embodiment of the present invention, the anti-degradant comprises a compound of Formula I and a compound of Formula II, wherein the mass ratio of the compound of Formula I to the compound of Formula II is 1:3 to 3:1, and preferably 1:2 to 2:1.

In another embodiment of the present invention, the anti-degradant comprises a compound of Formula II and a compound of Formula III-a or III-b, wherein the mass ratio of the compound of Formula II to the compound of Formula III-a or III-b is 1:3 to 3:1, and preferably 1:2 to 2:1.

In another embodiment of the present invention, the anti-degradant comprises a compound of Formula I and a compound of Formula III-a, wherein the mass ratio of the compound of Formula I to the compound of Formula III-a is 1:3 to 3:1, and preferably 1:2 to 2:1.

In another embodiment of the present invention, the anti-degradant comprises a compound of Formula I, a compound of Formula II, and a compound of Formula III-a or III-b, wherein the mass percentage of the compound of Formula I is 5-20%, the mass percentage of the compound of Formula II is 45-85%, and the mass percentage of the compound of Formula III-a or Formula III-b is 5-45%, based on the total mass of the compounds of Formulae I, II, and III-a or III-b.

In another embodiment of the present invention, the anti-degradant comprises a compound of Formula I, a compound of Formula II, and a compound of Formula III-a or III-b, wherein the mass percentage of the compound of Formula I is 8-18%, the mass percentage of the compound of Formula II is 48-82%, and the mass percentage of the compound of Formula III-a or III-b is 8-42%, based on the total mass of the compounds of Formulae I, II, and III-a or III-b.

In another embodiment of the present invention, the anti-degradant comprises a compound of Formula I, a compound of Formula II, and a compound of Formula III-b, wherein the mass percentage of the compound of Formula I is 10-17%, the mass percentage of compound of Formula II is 50-80%, and the mass percentage of the compound of Formula III-b is 10-40%, based on the total mass of the compounds of Formulae I, II, and III-b.

In another embodiment of the present invention, the anti-degradant comprises a compound of Formula I, a compound of Formula II, and a compound of Formula III-b, wherein $R_1$ is a C1-C4 alkyl in an ortho- or para-position in the compound of Formula II, and $R_3$ is a C1-C6 alkyl in a meta- or para-position in the compound of Formula III-b.

In another embodiment of the present invention, the anti-degradant comprises a compound of Formula I, a compound of Formula II, and a compound of Formula III-b, wherein $R_1$ is methyl in an ortho-position or methyl or butyl in a para-position in the compound of Formula II, and $R_3$ is ethyl or isobutyl in a para-position or 1,3-dimethylbutyl in a meta-position in the compound of Formula III-b.

In the present invention, the anti-degradant may further comprise an anti-degradant that is a p-phenylenediamine anti-degradant, for examples, N,N'-bis-(1,4-dimethylamyl)-p-phenylenediamine (77PD), N-isopropyl-N'-phenyl-p-phenylenediamine (IPPD), N-1,3-dimethylbutyl-N'-phenyl-p-phenylenediamine (6PPD), or a mixture of diphenyl xylyl p-phenylenediamine and phenyl tolyl p-phenylenediamine (3100).

The present invention further provides a rubber composition comprising the anti-degradant of the present invention. The rubber composition of the present invention may further comprise a diene elastomer, a reinforcing filler, and a crosslinker. The anti-degradant may be used in the rubber composition of the present invention in an amount of 0.1-5 parts by mass based on 100 parts by mass of the diene elastomer.

The present invention further provides a rubber article prepared using the rubber composition of the present invention as a rubber ingredient. The rubber article of the present invention may be a tire. Particularly, the rubber article of the present invention may a belt ply and a sidewall of a tire.

The present invention further provides use of the anti-degradant of the present invention for promoting resistance of a rubber to thermo-oxidative aging and ozone aging.

DETAILED DESCRIPTION OF THE INVENTION

It should be appreciated that, in the scope of the present invention, the technical features of the present invention described above and those technical features to be described in detail below (e.g. in the Examples) can be combined with each other to form preferred technical solutions.

The present invention provides a diene elastomer composition and an anti-degradant used in the composition for anti-aging protection. More particularly, the present invention provides a diene elastomer composition for manufacture of an entire or partial rubber matrix of a tire, particularly for a sidewall rubber composition and a belt ply rubber composition for the tire.

The anti-degradant of the present invention comprises at least two compounds, each of the compounds is selected from a compound of Formula I, a compound of Formula II, a compound of Formula III-a, or a compound of Formula III-b, provided that selected compounds have different formulae and when there are only two compounds in the anti-degradant, the two compounds are not compounds of Formulas III-a and III-b at the same time:

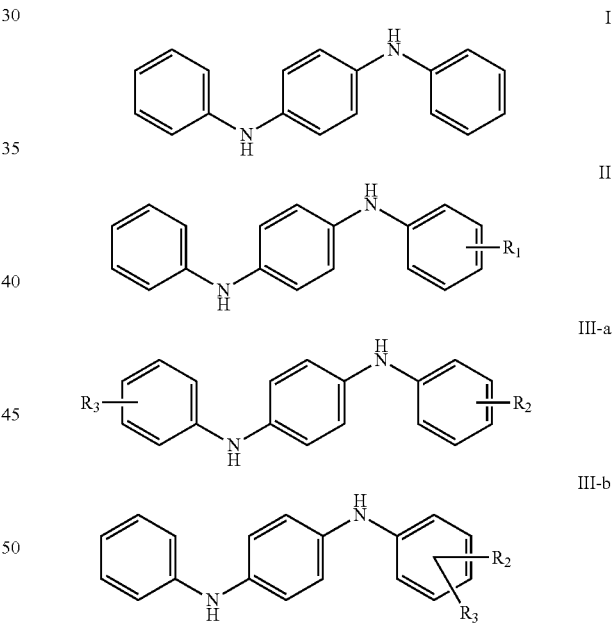

wherein $R_1$, $R_2$ and $R_3$ are identical or different, each being independently selected from a C1-C12 alkyl and C3-C8 cycloalkyl.

An alkyl used in the present invention may be a linear or branched alkyl. The alkyl used in the present invention may have a length of 1-12 carbon atoms. For examples, the alkyl is a linear or branched C1-C6 alkyl. For another examples, the alkyl may be methyl, ethyl, n-butyl, iso-butyl, 1,3-dimethylbutyl, or 2,4,6-trimethyloctyl. Examples of cycloalkyl used in the present invention include a cyclobutyl, cycloamyl, cyclohexyl, etc.

In the compound of Formula II of the present invention, $R_1$ may be in an ortho-, meta- or para-position. Suitable $R_1$ may be a C1-C12 alkyl, or a C3-C8 cycloalkyl. For examples, $R_1$ may be methyl, butyl, 2,4,6-trimethyloctyl, or cyclohexyl. For another examples, $R_1$ may be a C1-C6 alkyl (preferably C1-C4 alkyl) in an ortho-position or a C1-C12 alkyl or C3-C8 cycloalkyl in the para-position. For yet another examples, $R_1$ may be methyl in an ortho-position, cyclohexyl in the para-position, methyl in a para-position, 2,4,6-trimethyloctyl in a para-position, or butyl in an ortho-position.

In the compounds of Formula III-a and III-b, $R_2$ and $R_3$ each may be in an ortho-, meta-, or para-position, respectively. In some embodiments, $R_2$ and $R_3$ each independently are a C1-C6 alkyl. It is understood that $R_2$ and $R_3$ are linked to different carbon atoms in Formula III-b. Further, $R_2$ may be a C1-C4 alkyl. In some embodiments, $R_2$ is in an ortho-position, and $R_3$ is in a meta- or para-position.

In the compound of Formula III-a, $R_2$ may be a C1-C4 alkyl in an ortho-position, and $R_3$ may be a C1-C4 alkyl in a meta-position. Preferably, $R_2$ is methyl in an ortho-position, and $R_3$ is methyl or ethyl in a meta-position.

In the compound of Formula III-b, $R_2$ may be a C1-C4 alkyl in an ortho-position, and $R_3$ may be a C1-C6 alkyl in a meta- or para-position. For example, $R_2$ is methyl in an ortho-position, and $R_3$ is isobutyl in a para-position. For another example, $R_2$ is methyl in an ortho-position, and $R_3$ is 1,3-dimethylbutyl in a meta-position. For yet another example, $R_2$ is ethyl in an ortho-position, and $R_3$ is ethyl in a para-position.

In one embodiment of the present invention, the anti-degradant comprises a compound of Formula I and a compound of Formula II. Preferably, $R_1$ in the compound of Formula II is a C3-C8 cycloalkyl, and more preferably cyclohexyl. Preferably, the mass ratio of the compound of Formula I to the compound of Formula II in the anti-degradant is 1:3 to 3:1, and more preferably 1:2 to 2:1.

In another embodiment of the present invention, the anti-degradant comprises a compound of Formula I and a compound of Formula III-a. Preferably, the mass ratio of the compound of Formula I to the compound of Formula III-a in the anti-degradant is 1:3 to 3:1, and more preferably 1:2 to 2:1.

In yet another embodiment of the present invention, the anti-degradant comprises a compound of Formula II and one or both of compounds of Formulae III-a and III-b. For example, the anti-degradant comprises a compound of Formula II and a compound of Formula III-b. In the embodiment, preferably, $R_1$ is a C1-C12 alkyl, and more preferably 2,4,6-trimethyloctyl, in the compound of Formula II. In the compound of Formula III-a, $R_2$ is a C1-C4 alkyl in an ortho-position, and preferably, methyl, and $R_3$ is a C1-C4 alkyl in a meta-position, and preferably, ethyl. In the compound of Formula III-b, $R_2$ is a C1-C4 alkyl in an ortho-position, and $R_3$ is a C1-C6 alkyl in a meta- or para-position. In one preferred embodiment of the anti-degradant of the present invention, $R_1$ is 2,4,6-trimethyloctyl in a para-position in the compound of Formula II; and in the compound of Formula III-b, $R_2$ is methyl in an ortho-position, and $R_3$ is isobutyl in a para-position; or $R_2$ is methyl in an ortho-position, and $R_3$ is 1,3-dimethylbutyl in a meta-position; or $R_2$ is ethyl in an ortho-position, and $R_3$ is ethyl in an ortho-position. Preferably, the mass ratio of the compound of Formula II to the compound of Formula III-a or III-b is 1:3 to 3:1, and preferably 1:2 to 2:1.

In yet another embodiment of the present invention, the anti-degradant comprises a compound of Formula I, a compound of Formula II, and one or both of compounds of Formulae III-a and III-b. Preferably, $R_1$ is a C1-C4 alkyl in an ortho-position in the compound of Formula II, for example, a methyl; in the compound of Formula III-a, $R_2$ is a C1-C4 alkyl, for example, methyl, in an ortho-position, and $R_3$ is a C1-C4 alkyl, for example, ethyl, in a meta-position; in the compound of Formula III-b, $R_2$ is a C1-C4 alkyl in an ortho-position, and $R_3$ is a C1-C6 alkyl in a meta- or para-position. In the embodiment, the anti-degradant of the present invention may comprise a compound of Formula I, a compound of Formula II, and a compound of Formula III-b, wherein $R_1$ is methyl in an ortho-position, while $R_2$ is methyl in an ortho-position, and $R_3$ is isobutyl in a para-position; or $R_2$ is methyl in an ortho-position, and $R_3$ is 1,3-dimethylbutyl in a meta-position; or $R_2$ is ethyl in an ortho-position, and $R_3$ is ethyl in an ortho-position. In preferred embodiments of the anti-degradant of the present invention, based on the total mass of the compound of Formula I, the compound of Formula II, and the compound of Formula III-a and/or III-b, the compound of Formula I has a mass percentage of 5-20%, the compound of Formula II has a mass percentage of 45-85%, the compound of Formula III-a and/or the compound of Formula III-b has a mass percentage (a sum of their mass percentages when both of them are present) of 5-45%. Preferably, the compound of Formula I has a mass percentage of 8-18%, the compound of Formula II has a mass percentage of 48-82%, the compound of Formula III-a or Formula III-b has a mass percentage of 8-42%. Preferably, the anti-degradant comprises a compound of Formula I, a compound of Formula II, and a compound of Formula III-b, wherein the compound of Formula I has a mass percentage of 10-17%, the compound of Formula II has a mass percentage of 50-80%, and the compound of Formula III-b has a mass percentage of 10-40%, based on the total mass of the compound of Formula I, the compound of Formula II, and the compound of Formula III-b.

As a novel composite anti-degradant, the anti-degradant of the present invention differs from the anti-degradant 3100 known in the art. However, the anti-degradant of the present invention may further comprise an additional anti-degradant known in the art, such as a p-phenylenediamine anti-degradant, for examples, N,N'-bis-(1,4-dimethylamyl)-p-phenylenediamine (77PD), N-isopropyl-N'-phenyl-p-phenylenediamine (IPPD), N-1,3-dimethylbutyl-N'-phenyl-p-phenylenediamine (6PPD) and a mixture of diphenyl xylyl p-phenylenediamine and phenyl tolyl p-phenylenediamine (3100). These known anti-degradants may be added into the anti-degradant of the present invention in a conventional amount. In particular, the amount generally meets the following requirement is that when an anti-degradant composition of the present invention comprising the known anti-degradant is incorporated into a rubber composition, the additional known anti-degradant is 0.1-1.5 parts by mass per 100 parts by mass of a diene elastomer.

The anti-degradant of the present invention provides a rubber composition with better long-term resistance to thermo-oxidative aging and ozone aging. As such, the present invention further provides a rubber composition comprising the anti-degradant of the present invention. Generally, the rubber composition further comprises a diene elastomer, a reinforcing filler, and a crosslinker. Generally, based on 100 parts by mass of the diene elastomer, the amount of the anti-degradant in the rubber composition is 0.1-5 parts by mass, for example, 0.1-2.0 parts by mass, or 1.2-5.0 parts by mass.

The rubber composition may further comprise other conventional ingredients, including without limitation to fillers, processing aids, microcrystalline wax, sulfur, promoters, etc.

Fillers may be titanium oxide, magnesium oxide, calcium carbonate, magnesium carbonate, aluminum hydroxide, magnesium hydroxide, clay, talc, etc. Generally, a filler is used in an amount of 40-60 parts by weight per 100 parts by weight of a crude rubber.

A processing aid may be, for example, a softener used for improving processability. Softeners may be petroleum softeners, such as processing oil, lubricant, paraffin, liquid paraffin, petroleum asphalt and vaseline; fatty oil softeners, such as castor oil, linseed oil, rapeseed oil and coconut oil, wax (e.g. beewax, carnauba wax and lanolin), as well as tall oil, linoleic acid, palmic acid, stearic acid and lauric acid, etc. Generally, a processing aid is used in an amount of 10-18 parts by weight per 100 parts by weight of a crude rubber.

Generally, sulfur is used in an amount of 1-3 parts by weight per 100 parts by weight of a crude rubber.

Promoters are generally vulcanization accelerators, which may be at least one of sulfonamide, thiazole, thiuram, thiourea, guanidine, dithiocarbamate, aldimine, aldehyde ammonia, imidazoline and xanthic acid vulcanization accelerators. Generally, a promoter is used in an amount of 0.5-1.3 parts by weight per 100 parts by weight of a crude rubber.

In addition, when necessary, a plasticizer may be used in a pollutant-type rubber, for example, DMP (dimethyl phthalate), DEP (diethyl phthalate), DBP (dibutyl phthalate), DHP (diheptyl phthalate), DOP (dioctyl phthalate), DINP (diisononyl phthalate), DIDP (di-isodecyl phthalate), BBP (butyl benzyl phthalate), DWP (dilauryl phthalate) and DCHP (dicyclohexyl phthalate), etc. A plasticizer is used in a conventional amount in the art.

The pollutant-type rubber article of the present invention can be prepared using a conventional method. For example, a two-stage mixing process may be used for the preparation. The first stage mixing is performed in an internal mixer, wherein a crude rubber, a filler, a processing aid and an anti-degradant are blended, and the rubber is discharged at a temperature of 130° C. or higher. The second stage mixing is performed in an open mill, wherein the mixed rubber from the first stage is blended with sulfur and a promoter, and a sheet is discharged at a temperature of 70° C. The vulcanization condition: 145° C.×30 min.

The present invention further provides a rubber article prepared using the rubber composition of the present invention as a rubber ingredient. For example, the rubber article may be a tire, for example, an entire or partial tire. In some embodiments, the rubber article is a belt ply and a sidewall of a tire. As a belt ply of a tire, the rubber article may further comprise a reinforcing material conventionally used in the art in addition to the rubber composition.

The present invention further provides use of the anti-degradant of the present invention for promoting resistance of a rubber to thermo-oxidative aging and ozone aging. The present invention further provides use of the rubber composition of the present invention for manufacturing or retreading tires.

The present invention further provides the compounds of Formulae II, III-a, and III-b and the use thereof in preparation of anti-degradants. In particular, the present invention includes the compounds of Formulae II, III-a and III-b:

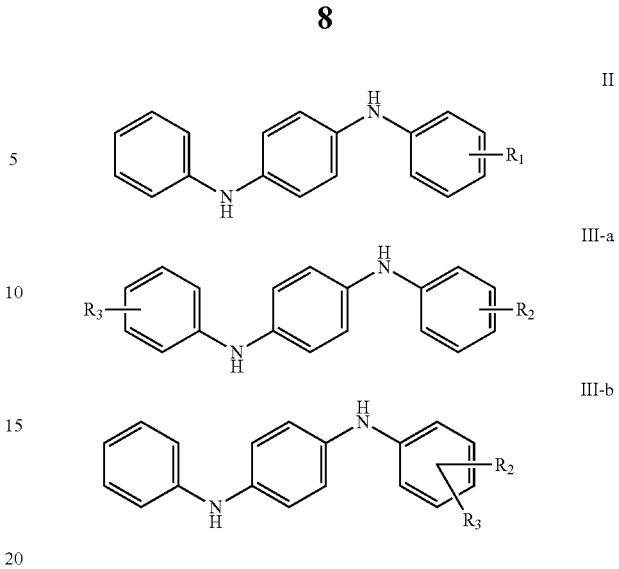

wherein $R_1$, $R_2$ and $R_3$ are described above with reference to any embodiment.

Preferably, the compound of Formula II excludes compounds in which $R_1$ is a methyl in an ortho-position. For examples, in the compound of Formula II, $R_1$ is a C3-C8 cycloalkyl or C1-C12 alkyl in the para-position, or a C2-C4 alkyl in the ortho-position.

Preferably, in the compound of Formula III-a, $R_2$ and $R_3$ are not methyl in an ortho-position at the same time. For example, in some embodiments, in the compound of Formula III-a, $R_2$ is a C1-C4 alkyl in an ortho-position, and $R_3$ is a C1-C4 alkyl in a meta-position.

Preferably, in the compound of Formula III-b, $R_2$ and $R_3$ are linked to different carbon atoms, $R_2$ is a C1-C4 alkyl in an ortho-position, and $R_3$ is a C1-C6 alkyl in a meta-position or a C1-C4 alkyl in a para-position.

The present invention further provides a composition comprising compounds of Formulae II, III-a and/or III-b, e.g., an anti-degradant.

The compounds of Formulae I, II, III-a, and III-b may be prepared with reference to the methods disclosed by CN106608827A which is incorporated herein by reference in its entirety. For instance, R'—NHC$_6$H$_4$NH$_2$ may be reacted with cyclohexanone and/or alkyl or cycloalkyl substituted cyclohexanone in the presence of a hydrogen acceptor and a catalyst. For example, the method described in Example 1 in CN106608827A may be utilized to prepare a compound of Formula I in the present invention; and the method described in Example 6 in CN106608827A may be utilized to prepare N-phenyl-N'-tolyl p-phenylenediamine. When $R_1$, $R_2$ and $R_3$ are different substituents in the compounds of Formulae I, II, III-a, and III-b, the compounds of the present invention may be prepared using corresponding raw materials and hydrogen acceptors under the same or similar conditions.

The present invention is further illustrated with reference to specific examples. These examples are only illustrative, with no intent to limit the scope of the present invention. Unless otherwise indicated, the methods and materials used in the examples are conventional methods and materials in the art.

Example 1: Preparation of Rubber Composition

Rubber compositions are prepared from the recipes listed in Table 1 using the following steps in particular:

1. A reinforcing filler (carbon black N375), activating agents (zinc oxide, stearic acid) and an anti-aging system (3100, 6PPD, anti-degradant (I), anti-degradant (II), anti-degradant (III)) are added to a diene elastomer (natural rubber NR) in a mixer (e.g. an internal mixer), and the whole mixture is kneaded thermomechanically at one or more stages until a highest temperature between 110° C. and 190° C. is achieved.

2. The whole mixture is cooled to a temperature below 100° C., and a crosslinking system (sulfur and a promoter DZ) is added, followed by kneading the whole mixture until a highest temperature below 110° C. is achieved.

3. The final composition thus obtained is calendered into a form of sheet (2-3 mm in thickness) to measure physical or mechanical properties.

The vulcanization conditions are as follows: the vulcanization temperature is 145° C., and the time is 30 minutes.

TABLE 1

| Composition No. | C-1 | C-2 | C-3 | C-4 | C-5 | C-6 | C-7 | C-8 | C-9 | C-10 | C-11 | C-12 |
|---|---|---|---|---|---|---|---|---|---|---|---|---|
| NR(SCR5) | 100 | 100 | 100 | 100 | 100 | 100 | 100 | 100 | 100 | 100 | 100 | 100 |
| Black carbon (N375) | 50 | 50 | 50 | 50 | 50 | 50 | 50 | 50 | 50 | 50 | 50 | 50 |
| 3100 | 1.5 | 0 | 0 | 0 | 0 | 0 | 0 | 0 | 0 | 0 | 0 | 0 |
| 6PPD | 0 | 1.5 | 0 | 0 | 0 | 0 | 0 | 0 | 0 | 1.4 | 0 | 0 |
| Anti-degradant (I) | 0 | 0 | 1.5 | 0 | 0 | 0.5 | 0 | 0.15 | 0.25 | 0.1 | 0.5 | 0.5 |
| Anti-degradant (II) | 0 | 0 | 0 | 1.5 | 0 | 1.0 | 1.0 | 1.2 | 1.0 | 0 | 2.5 | 0 |
| Anti-degradant (III) | 0 | 0 | 0 | 0 | 1.5 | 0 | 0.5 | 0.15 | 0.25 | 0 | 2 | 1.0 |
| Zinc oxide | 5.0 | 5.0 | 5.0 | 5.0 | 5.0 | 5.0 | 5.0 | 5.0 | 5.0 | 5.0 | 5.0 | 5.0 |
| Stearic acid | 2.0 | 2 | 2.0 | 2.0 | 2.0 | 2.0 | 2.0 | 2.0 | 2.0 | 2.0 | 2.0 | 2.0 |
| Sulfur | 5.0 | 5 | 5.0 | 5.0 | 5.0 | 5.0 | 5.0 | 5.0 | 5.0 | 5.0 | 5.0 | 5.0 |
| Promoter DZ | 1.4 | 1.4 | 1.4 | 1.4 | 1.4 | 1.4 | 1.4 | 1.4 | 1.4 | 1.4 | 1.4 | 1.4 |

Notes:
(1) $R_1$ in anti-degradant (II) in C-4 is a methyl substituent in an ortho-position;
(2) Anti-degradant (III) in C-5 is III-a, wherein $R_2$ is a methyl substituent in an ortho-position, and $R_3$ is an ethyl substituent in a meta-position;
(3) $R_1$ in anti-degradant (II) in C-6 is a cyclohexyl substituent in a para-position;
(4) $R_1$ in anti-degradant (II) in C-7 is a 2,4,6-trimethyloctyl substituent in a para-position; and anti-degradant (III) is III-b, wherein $R_2$ is a methyl substituent in an ortho-position, and $R_3$ is an isobutyl substituent in a para-position;
(5) $R_1$ in anti-degradant (II) in C-8 is a methyl substituent in an ortho-position; and anti-degradant (III) is III-b, wherein $R_2$ is a methyl substituent in an ortho-position, and $R_3$ is an isobutyl substituent in a para-position;
(6) $R_1$ in anti-degradant (II) in C-9 is a methyl substituent in a para-position; and anti-degradant (III) is III-b, wherein $R_2$ is a methyl substituent in an ortho-position, and $R_3$ is a 1,3-dimethylbutyl substituent in a meta-position, opposite to $R_2$;
(7) $R_1$ in anti-degradant (II) in C-11 is a butyl substituent in an ortho-position; and anti-degradant (III) is III-b, wherein $R_2$ and $R_3$ are both ethyl groups, in an ortho-position and a para-position respectively;
(8) Anti-degradant (III) in C-12 is III-a, wherein $R_2$ is a methyl substituent in an ortho-position, and $R_3$ is a methyl substituent in a meta-position.

Example 2: Properties Testing

1. Properties Testing for Unvulcanized Rubber

Properties of rubber materials before vulcanization are tested according to GB/T 16584-1996 "Rubber—Measurement of Vulcanization Characteristics With Rotorless Curemeter."

2. Properties Testing for Vulcanized Rubber

Tensile properties of the rubber materials after vulcanization are measured according to GB/T 528-2009 "Measurement of Tensile Stress and Strain Properties of Vulcanized Rubber or Thermoplastic Rubber." The tensile properties testing results before aging are shown in Table 2.

The vulcanized rubber materials are subjected to hot air aging testing according to GB/T 3512-2014 "Testing of Accelerated Hot Air Aging and Heat Resistance of Vulcanized Rubber or Thermoplastic Rubber." The tensile properties testing results after aging are shown in Table 2.

TABLE 2

| Composition No. | C-1 | C-2 | C-3 | C-4 | C-5 | C-6 | C-7 | C-8 | C-9 | C-10 | C-11 | C-12 |
|---|---|---|---|---|---|---|---|---|---|---|---|---|
| Properties before vulcanization | | | | | | | | | | | | |
| t10(min · sec) | 2.08 | 2.06 | 1.55 | 2.07 | 2.16 | 2.10 | 2.12 | 2.08 | 2.11 | 2.07 | 1.31 | 2.09 |
| t90(min · sec) | 17.40 | 18.00 | 17.53 | 18.05 | 18.18 | 18.03 | 18.11 | 17.40 | 18.09 | 17.55 | 16.25 | 17.98 |
| Tensile properties before aging | | | | | | | | | | | | |
| MA100 (MPa) | 6.3 | 5.9 | 6.6 | 6.4 | 6.2 | 6.3 | 6.5 | 6.5 | 6.4 | 6.0 | 6.5 | 6.4 |
| MA300 (MPa) | 19.9 | 19.7 | 20.8 | 20.0 | 19.9 | 20.1 | 20.0 | 20.2 | 20.1 | 20.0 | 20.7 | 20.1 |
| Elongation at break (%) | 328 | 335 | 318 | 327 | 315 | 320 | 319 | 323 | 330 | 331 | 320 | 322 |
| Tensile strength (MPa) | 21.3 | 22.0 | 21.5 | 21.6 | 22.5 | 22.3 | 22.2 | 22.4 | 22.5 | 22.1 | 21.9 | 22.1 |

TABLE 2-continued

| Composition No. | C-1 | C-2 | C-3 | C-4 | C-5 | C-6 | C-7 | C-8 | C-9 | C-10 | C-11 | C-12 |
|---|---|---|---|---|---|---|---|---|---|---|---|---|
| Tensile properties after aging (100° C., 72 hours) | | | | | | | | | | | | |
| Elongation at break (%) | 95 | 92 | 105 | 101 | 104 | 103 | 109 | 115 | 110 | 94 | 120 | 105 |
| Tensile strength (MPa) | 9.5 | 8.5 | 10.2 | 10.2 | 10.6 | 10.1 | 10.3 | 10.8 | 10.7 | 9.0 | 11.2 | 10.4 |

As seen from the Example, the physical properties of the various compositions are similar to those of the reference samples before aging, but after thermo-oxidative aging at 100° C. for 72 hours, the rubber compositions comprising the anti-aging systems of the present invention exhibit better tensile properties and better long-term resistance to thermo-oxidative aging.

Example 3: Ozone Testing

Ozone resistance of the rubber materials is tested in an ozone aging test chamber according to ISO 1431-1:2004 "Rubber, Vulcanized or Thermoplastic—Resistance to Ozone Cracking." The concentration by volume of ozone is 50 pphm, the temperature is (40±2)° C., and the humidity is (60±5)%. In static testing, the pre-elongation is 20%, and the testing is run continuously for 80 hours for observation of sample cracking. In dynamic testing, the pre-elongation is 10%, the frequency is 0.5 Hz, and the testing is run continuously for 60 hours for observation of sample cracking.

The results are shown in Tables 3 and 4 below.

TABLE 3

Static testing results

| Composition No. | Cracking |
|---|---|
| C-1 | Obvious |
| C-2 | Obvious |
| C-3 | Slight |
| C-4 | Slight |
| C-5 | Slight |
| C-6 | Slight |
| C-7 | Slight |
| C-8 | No |
| C-9 | No |
| C-10 | Slight |
| C-11 | No |
| C-12 | Slight |

TABLE 4

Dynamic testing results

| Composition No. | Cracking |
|---|---|
| C-1 | Obvious |
| C-2 | Obvious |
| C-3 | Slight |
| C-4 | Slight |
| C-5 | Slight |
| C-6 | Slight |
| C-7 | Slight |
| C-8 | No |
| C-9 | No |
| C-10 | Slight |
| C-11 | No |
| C-12 | Slight |

As indicated by the dynamic/static ozone aging testing, the rubber compositions comprising the anti-aging systems of the present invention exhibit better long-term resistance to dynamic/static ozone aging than reference samples C-1 and C-2.

The above tests prove that the rubber compositions comprising the anti-aging systems of the present invention show improved durability as compared with the control rubber compositions using conventional anti-degradants.

We claim:

1. An anti-degradant, comprising
at least a first compound and a second compound,
wherein the first compound is a compound of Formula III-a or Formula III-b, and
the second compound is a compound of Formula I, a compound of Formula II, the compound of Formula III-a, or the compound of Formula III-b:

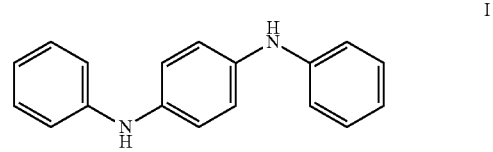

I

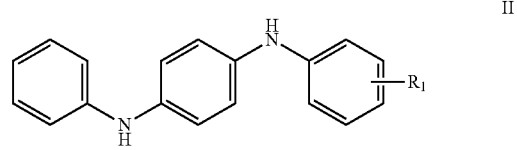

II

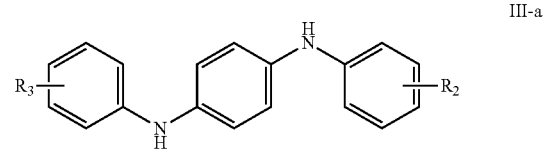

III-a

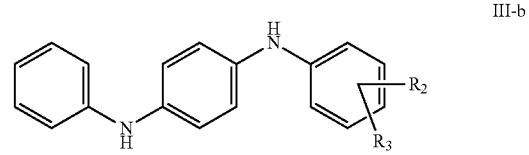

III-b wherein the at least two compounds are compounds of different formulae and are not compounds of Formulae III-a and III-b at the same time when the anti-degradant has only two compounds,
$R_1$ is a C1-C12 alkyl or C3-C8 cycloalkyl;
each of $R_2$ and $R_3$ is independently selected from the group consisting of a linear C1-C12 alkyl, a branched C1-C12 alkyl, and a C3-C8 cycloalkyl; and
when both $R_2$ and $R_3$ are linear or branched C1-C6 alkyls, R2 is in an ortho-position and R3 is in a para- or meta-position.

2. The anti-degradant of claim 1, wherein the anti-degradant comprises the compound of Formula I and the compound of Formula II, and a mass ratio of the compound of Formula I to the compound of Formula II is in a range of 1:3 to 3:1.

3. The anti-degradant of claim 1, wherein the anti-degradant comprises the compound of Formula II and one or both of the compounds of Formulae III-a and III-b, and a mass ratio of the compound of Formula II to a total of one or both of compounds of Formulae III-a and III-b is in a range of 3:1 to 1:3.

4. The anti-degradant of claim 1, wherein the anti-degradant comprises the compound of Formula I, the compound of Formula II, and one or both of the compounds of Formulae III-a and III-b, a mass percentage of the compound of Formula I is in a range of 5-20%, a mass percentage of the compound of Formula II is in a range of 45-85%, and a mass percentage of the one or both of the compounds of Formulae III-a and III-b is in a range of 5-45%, based on a total mass of all compounds.

5. The anti-degradant of claim 1, wherein anti-degradant comprises the compound of Formula I and the compound of Formula III-a, and a mass ratio of the compound of Formula I to the compound of Formula III-a is in a range of 3:1 to 1:3.

6. The anti-degradant of claim 1, wherein the anti-degradant comprises the compound of Formula I, the compound of Formula II, and the compound of Formula III-b, and a mass percentage of the compound of formula I is in a range of 5-20%, a mass percentage of the compound of formula II is in a range of 45-85%, and a mass percentage of the compound of formula III-b is in a range of 5-45%, based on a total mass of all compounds.

7. The anti-degradant of claim 1, wherein the anti-degradant comprises the compound of Formula I, the compound of Formula II, and the compound of Formula III-b;
$R_1$ is methyl in an ortho-position;
$R_2$ is methyl in an ortho-position and $R_3$ is isobutyl in a para-position; and
a mass percentage of the compound of formula I is in a range of 8-12%, a mass percentage of the compound of formula II is in a range of 78-82%, and a mass percentage of the compound of formula III-b is in a range of 8-12%, based on a total mass of all compounds.

8. The anti-degradant of claim 1, wherein the anti-degradant comprises the compound of Formula I, the compound of Formula II, and the compound of Formula III-b;
$R_1$ is methyl in a para-position;
$R_2$ is methyl in an ortho-position and $R_3$ is 1,3-dimethylbutyl in a meta-position; and
a mass percentage of the compound of Formula I is in a range of 15-18%, a mass percentage of the compound of Formula II is in a range of 64-68%, and a mass percentage of the compound of Formula III-b is in a range of 15-18%, based on a total mass of all compounds.

9. The anti-degradant of claim 1, wherein the anti-degradant comprises the compound of Formula I, the compound of Formula II, and the compound of Formula III-b;
$R_1$ is butyl in an ortho-position;
$R_2$ is ethyl in an ortho-position and $R_3$ is ethyl in a para-position; and
a mass percentage of the compound of Formula I is in a range of 8-12%, a mass percentage of the compound of Formula II is in a range of 48-52%, and a mass percentage of the compound of Formula III-b is in a range of 38-42%.

10. The anti-degradant of claim 1, wherein $R_1$ is a C1-C12 alkyl in a para-position or a C3-C8 cycloalkyl in a para-position.

11. The anti-degradant of claim 10, wherein $R_1$ is a cyclohexyl in a para-position or 2,4,6-trimethyloctyl in a para-position.

12. The anti-degradant of claim 1, wherein $R_2$ and $R_3$ each independently are C1-C6 alkyl.

13. The anti-degradant of claim 12, wherein one selected compound is the compound of Formula III-a, $R_2$ is a C1-C4 alkyl in an ortho-position, and $R_3$ is a C1-C4 alkyl in a meta-position.

14. The anti-degradant of claim 12, wherein one selected compound is the compound of Formula III-b, $R_2$ is a C1-C4 alkyl in an ortho-position, and $R_3$ is a C1-C6 alkyl in a meta- or para-position.

15. The anti-degradant of claim 12, wherein one selected compound is the compound of Formula III-a, $R_2$ is a methyl in an ortho-position, and $R_3$ is a methyl or ethyl in a meta-position.

16. The anti-degradant of claim 12, wherein one selected compound is the compound of Formula III-b, $R_2$ is a methyl in an ortho-position, and $R_3$ is an isobutyl in a para-position or 1,3-dimethylbutyl in a meta-position.

17. The anti-degradant of claim 12, wherein one selected compound is the compound of Formula III-b, $R_2$ is an ethyl in an ortho-position, and $R_3$ is an ethyl in a para-position.

18. A rubber composition, comprising the anti-degradant of claim 1.

19. The rubber composition of claim 18, further comprising
a diene elastomer,
wherein content of the anti-degradant is in a range of 0.1-5 parts by mass per 100 parts by mass of the diene elastomer in the rubber composition.

20. A rubber article prepared using the rubber composition of claim 18 as a rubber ingredient.

21. The rubber article of claim 20, wherein the rubber article is a tire, or a belt ply or sidewall of the tire.

22. A method for promoting resistance of a rubber to thermo-oxidative aging and ozone aging, comprising using the anti-degradant of claim 1 as anti-degradant for preparing the rubber.

23. A method for manufacturing or retreading tires, comprising using the rubber composition of claim 18 to manufacture or retread tires.

24. A compound having a structure as shown in Formula II:

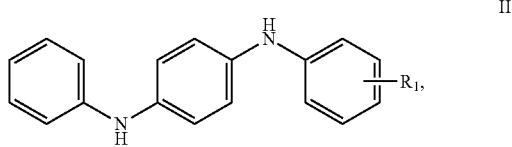

wherein $R_1$ is a C3-C8 cycloalkyl in an ortho-, meta-, or para-position, a branched C3-C12 alkyl in the ortho-, meta-, or para-position, or a linear C1-C12 alkyl in the para-position.

25. An anti-degradant, comprising a first compound as described in claim 24, and a second compound that is a compound of Formula I, a compound of Formula III-a, or a compound of Formula III-b:

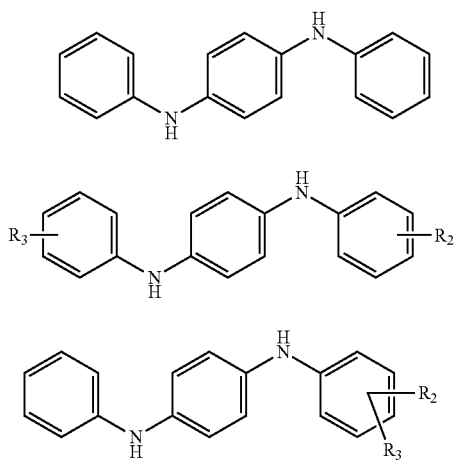

wherein each of $R_2$ and $R_3$ is independently selected from the group consisting of a linear C1-C12 alkyl, a branched C1-C12 alkyl, and a C3-C8 cycloalkyl.

26. A compound having a structure as shown in Formula III-a or Formula III-b:

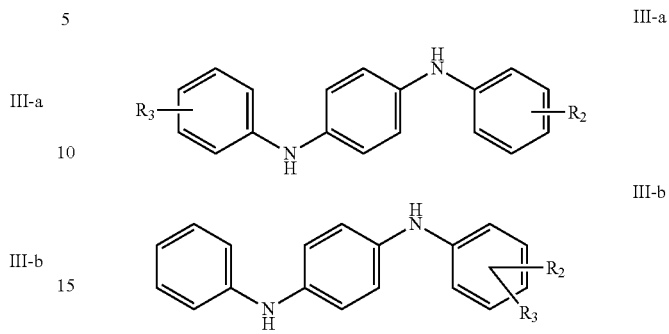

wherein each of $R_2$ and $R_3$ is independently selected from a linear or branched C1-C12 alkyl or a C3-C8 cycloalkyl; when both $R_2$ and $R_3$ are linear or branched C1-C6 alkyls, R2 is in an ortho-position and R3 is in a para- or meta-position.

* * * * *